US010905616B2

(12) United States Patent
Hatry

(10) Patent No.: US 10,905,616 B2
(45) Date of Patent: Feb. 2, 2021

(54) METHOD OF PREPARING A LIKENESS OF A DECEASED HUMAN OR ANIMAL

(71) Applicant: Heide Hatry, Heidelberg (DE)

(72) Inventor: Heide Hatry, Heidelberg (DE)

( * ) Notice: Subject to any disclaimer, the term of this patent is extended or adjusted under 35 U.S.C. 154(b) by 0 days.

(21) Appl. No.: 16/577,030

(22) Filed: Sep. 20, 2019

(65) Prior Publication Data

US 2020/0093673 A1 Mar. 26, 2020

Related U.S. Application Data

(60) Provisional application No. 62/734,638, filed on Sep. 21, 2018.

(51) Int. Cl.

*A61C 17/08* (2006.01)
*A61G 17/08* (2006.01)
*B44D 3/18* (2006.01)
*E04H 13/00* (2006.01)

(52) U.S. Cl.

CPC ............... *A61G 17/08* (2013.01); *B44D 3/18* (2013.01); *E04H 13/008* (2013.01)

(58) Field of Classification Search

CPC .. A61G 17/0106; A61G 17/004; A61G 17/08; A61G 17/00; A61G 99/00; B44D 3/18; B44D 5/00; E04H 13/008; B44C 5/00
USPC ...................... 27/1; 428/542.4; 427/258, 262
See application file for complete search history.

(56) References Cited

U.S. PATENT DOCUMENTS

| | | | | | |
|---|---|---|---|---|---|
| 232,782 | A * | 9/1880 | Townsend | A61G 17/08 | 27/1 |
| 1,640,680 | A * | 8/1927 | Vanderlaan | C04B 33/16 | 428/542.2 |
| 5,016,330 | A * | 5/1991 | Botsch | E04H 13/008 | 27/1 |
| 6,023,822 | A * | 2/2000 | Luebke | A61G 17/08 | 27/1 |
| 6,170,136 | B1 * | 1/2001 | Wilson-Brokl | A61G 17/08 | 27/1 |
| 6,200,507 | B1 * | 3/2001 | Dennis | B29C 70/745 | 264/73 |
| 6,382,111 | B1 * | 5/2002 | Hojaji | B44C 5/00 | 110/341 |
| 6,615,463 | B1 * | 9/2003 | Hojaji | C04B 33/135 | 27/1 |
| 6,665,916 | B1 * | 12/2003 | Santorello | A61G 17/08 | 27/1 |
| 6,785,938 | B1 * | 9/2004 | Johansen, Jr. | A61G 17/0136 | 27/1 |
| 7,266,866 | B2 * | 9/2007 | Vogel | C03B 1/00 | 27/1 |
| 7,526,844 | B2 * | 5/2009 | Pearce | A61G 17/08 | 27/1 |
| 8,627,555 | B2 * | 1/2014 | Kennedy | C03C 17/3411 | 27/1 |
| 9,168,573 | B2 * | 10/2015 | Hojaji | C03C 14/00 | |
| 9,610,207 | B1 * | 4/2017 | Fort | E04H 13/008 | |
| 9,700,923 | B2 * | 7/2017 | Camps | B09B 3/0025 | |
| 10,688,006 | B2 * | 6/2020 | Seltzer | A63H 9/00 | |

(Continued)

*Primary Examiner* — William L Miller
(74) *Attorney, Agent, or Firm* — MG Miller Intellectual Property Law LLC

(57) ABSTRACT

A method for preparing a likeness of a deceased human or animal, incorporating said human or animal's cremains in the likeness, prepared on a flat surface, is disclosed.

15 Claims, 1 Drawing Sheet

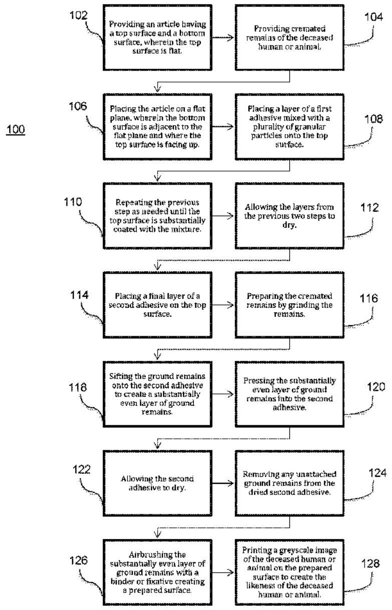

(56) References Cited

U.S. PATENT DOCUMENTS

| | | | | |
|---|---|---|---|---|
| 2001/0056309 | A1* | 12/2001 | Jain | G05B 19/4207 700/98 |
| 2002/0025392 | A1* | 2/2002 | Yardley | C03C 14/004 428/3 |
| 2003/0154581 | A1* | 8/2003 | Jain | A61G 17/08 27/1 |
| 2003/0221299 | A1* | 12/2003 | Santorello | A61G 17/08 27/1 |
| 2009/0077779 | A1* | 3/2009 | Zimmerman | E04H 13/008 27/1 |

* cited by examiner

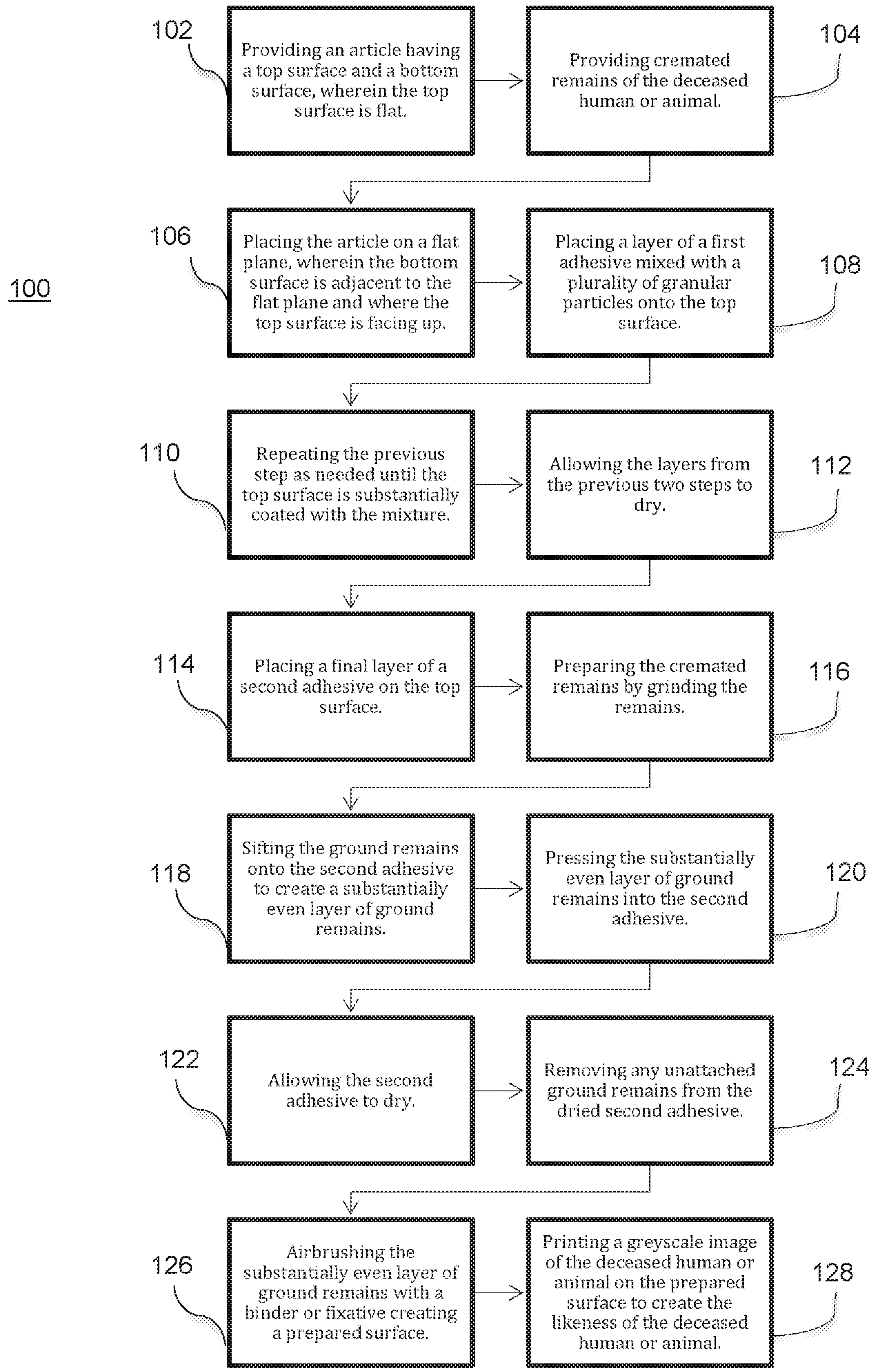
100
102
Providing an article having a top surface and a bottom surface, wherein the top surface is flat.
104
Providing cremated remains of the deceased human or animal.
106
Placing the article on a flat plane, wherein the bottom surface is adjacent to the flat plane and where the top surface is facing up.
108
Placing a layer of a first adhesive mixed with a plurality of granular particles onto the top surface.
110
Repeating the previous step as needed until the top surface is substantially coated with the mixture.
112
Allowing the layers from the previous two steps to dry.
114
Placing a final layer of a second adhesive on the top surface.
116
Preparing the cremated remains by grinding the remains.
118
Sifting the ground remains onto the second adhesive to create a substantially even layer of ground remains.
120
Pressing the substantially even layer of ground remains into the second adhesive.
122
Allowing the second adhesive to dry.
124
Removing any unattached ground remains from the dried second adhesive.
126
Airbrushing the substantially even layer of ground remains with a binder or fixative creating a prepared surface.
128
Printing a greyscale image of the deceased human or animal on the prepared surface to create the likeness of the deceased human or animal.

METHOD OF PREPARING A LIKENESS OF A DECEASED HUMAN OR ANIMAL

CLAIM OF PRIORITY

This application claims priority to U.S. Provisional Patent Application No. 62/734,638 entitled "METHOD OF PREPARING A LIKENESS OF A DECEASED HUMAN OR ANIMAL" filed on Sep. 21, 2018, the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The field of the present invention and its embodiments relate to a method of preparing a likeness of a deceased human or animal. More particularly, the present disclosure relates to a method of preparing a likeness of a deceased human or animal using the cremains of said human or animal.

BACKGROUND

Losing a friend or family member can be one of the most difficult misfortunes anyone can go through. During these emotionally challenging times, many people often find themselves struggling to cope with the passing of a loved one. Memorializing the dearly departed is an important part of the grieving process and up until now, the methods for honoring our loved ones has stayed the same. Prior to the $20^{th}$ century, people were aware of the consoling power of the deceased's body. Practices included using the dead body or parts thereof to create memorials, post-mortem photographs, jewelry, shrines, and chapels. Examples of this include sculptures made of bone, and pictures made, at least partially, of hair. While these methods existed, many of them are archaic and do not offer the same comfort today that they once did. Today, there is an abundance of memorial artwork and keepsakes that people use to remember their loved ones. However, these pieces are impersonal, produced mechanically and have no artistic value, which often leave the grieving parties dissatisfied.

Nevertheless, within the past century, the rate of deceased people being cremated has increased from roughly 30% to roughly 70%. This results in there being an abundance of ashes, which are occasionally placed in urns with little-to-no connection with the deceased. Further, many of these urns are very low quality, and border on being kitschy. Making things even worse, the vast majority of people have the cremains of their loved ones thrown away or scattered, leaving nothing behind to remember the deceased.

This abundance of cremains and lack of options for people to turn those cremains into a memorable, dignified artistic remembrance presents an opportunity. As such, there is a need for a way for people to have a portrait of their deceased love one which is partially comprised of the cremains of said loved one, in a way that does not require an inordinate amount of time, making such a portrait widely available. This type of tribute provides the benefit of evoking fond emotions due to the quality and beauty of the work, provides an homage to the roots of memorialization, and provides a genuine relic of the deceased for the loved ones to enjoy in perpetuity.

While these articles may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

An aspect of an example embodiment in the present disclosure is to provide a method for preparing a likeness of a deceased person or animal.

Accordingly, the present disclosure describes a method of preparing a likeness of a deceased human or animal. The method begins by providing an article, which has a top surface and a bottom surface, where the top surface is flat. The article may be rigid like a wooden board, or may be flexible like a canvas. The bottom surface may also be flat but the top surface is where the likeness of the deceased human or animal is placed, making such flatness of particular import. The method also requires that cremated remains of the deceased human or animal are provided for further processing.

The method proceeds by then having the article placed on a flat plane, where the bottom surface is adjacent to the flat plane and where the top surface is facing up. At least one layer a first adhesive mixed with a plurality of granular particles onto the top surface. Preferably between two to four layers are placed until the top surface is substantially coated with the mixture. Also preferably, these layers are placed via a high density foam roller. The granular particles may be sand, the cremains of the deceased human or animal, or some combination thereof. In various embodiments the granular particles and the first adhesive are mixed with at least one dye or other coloring agent. In other embodiments, the top surface is initially treated with at least one layer of paint, which is preferably gesso.

The method then allowing the layers of the first adhesive/granular particle mixture to dry. After those layers have dried, a final layer of a second adhesive on the top surface, which is preferably cellulose glue and a binder. The cremated remains must also be processed and this is done by grinding the remains into a powder. Once sufficiently pulverized, the ground remains are sifted onto the second adhesive to create a substantially even layer of ground remains on top. This is preferably done with a simple flour sifter, although other devices are suitable for this purpose such as a wire mesh, or other types of sifters that work with finer granulates. After an even coating has been achieved, the ground remains are pressed into the second adhesive, which is then allowed to dry. Once the second adhesive has dried, the method proceeds to remove any unattached ground remains from the dried second adhesive. The top surface is then airbrushed with a binder or fixative creating a prepared surface. Preferably, the fixative is a reworkable clear finish, such as the Workable Fixatif, produced by Krylon Products Group, a subsidiary of Sherwin-Williams Company.

After the surface has been prepared, a grayscale image of the deceased human or animal is printed on the prepared surface to create the likeness of the deceased human or animal. This may be done more than one time and is preferably done by a flatbed printer. It is desirable to place the prepared likeness of the deceased human or animal in a shadowbox.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

FIG. 1 is a flow chart showing an exemplary embodiment of a method of preparing a likeness of a deceased human or animal in accordance with the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

FIG. 1 illustrates an exemplary embodiment of the method of preparing a likeness of a deceased human or animal. Here, the method 100 beings with step 102 where a porous article with a top surface and a bottom is provided, where the top surface is flat or substantially flat. The article may be something rigid such as a piece of wood, or the article may be something flexible such as an artist's canvas. Additionally, the article may be porous, although non-porous articles are used in some embodiments of the method 100. In step 104 the method provides for the cremated remains or cremains of a deceased human or animal. The cremains may be that of a human or animal as many people feel strong attachments to deceased pets as well as deceased humans, as the method can be used for any mammalian cremains.

The article is placed on a flat plane, where the bottom surface is adjacent to the flat plane such that the top surface is facing up in step 106. Proceeding to step 108, a layer of a mixture of a first adhesive and a plurality of granular particles is placed on the top surface. This first adhesive is preferably a heavy acrylic binder, but can be other types of binders and adhesives as well. The adhesive can also be wax, preferably bees wax, which has to be heated so that it is fluid. Note that if bees wax is used, the method can skip steps 110 to 116, and continues immediately with step 118. Also other heatable glues can be used. The granular particles used in step 108 may be a portion of the cremains of the deceased animal or human, but may also be sand if the amount of available cremains is limited. In alternative embodiments, this mixture is further mixed with some white paint, preferably white acrylic paint. Step 110 calls for the repetition of step 108 until the top surface is substantially coated with the mixture. In a preferred embodiment, two to four layers of the mixture are placed on the top surface. Preferably, the mixture is deposited using a high-density foam paint roller, but can also be done using a short hair or fine sponge roller. A powered roller or a texture sprayer are also suitable for use with the method in accordance with the present disclosure. In step 112, the placed layers of the mixture are allowed to dry. The amount of time this will take will depend on the temperature and humidity of the ambient environment, as well as the chemical composition of the adhesive and the cremains.

In step 114, a final layer of a second adhesive is placed on the top surface on top of the dried layers of mixtures. In a highly preferred embodiment, this second adhesive is a cellulose glue as it connects well with the calcium found in the remains, as well as with acrylic binder. In other embodiments, the cellulose glue is constructed from seaweed, mixed with a dispersion binder, such as Kremer® Dispersion K498, or some other thermoplastic acrylic polymer which is miscible in water. In various embodiments, the ratio of seaweed and dispersion dye can be different depending on the consistency of the layer placed in step 108 and the consistency of the cremains. In all embodiments, step 116 is done in advance as steps 118 and 120 must be done in rapid succession after step 114 unless a Lascaux or Polyvinyl alcohol is also mixed in during step 114. Preferably the Lascaux retarded makes up 10% of the solution, when used. In step 116, the cremains of the human or animal, are ground. This can be done by via a mortar and pestle but can also be subsequently sifted to remove any large chunks of cremains as well as dust that is too fine. Preferably, the grinding is performed using a burr grinder to ensure that the granules generated by the grinding are in a substantially consistent particle size.

After the cremains have been prepared in step 116, the method proceeds to step 118 where the prepared cremains are sifted onto the still-wet second adhesive. This is done such that a substantially even amount of the ground remains are coating the second adhesive and accordingly the top surface of the article. In a highly preferred embodiment, the granules are sifted in multiple stages, preferably with a multi-layered mechanical sifter. That is, multiple fractions of the granules, based on particle size, will be created through the sifting. However, unlike conventional sifting, the largest granules must be deposited on the surface first, and then the smaller particles are deposited to fill in any gaps created by the deposited large particles. Preferably, a machine such as the Kunhewuhua® Electric Vibrating Sieve Machine will be used to sift the granules.

In some embodiments, the method contains an additional step, as follows: the surface is placed on a kinetic vibrating table to assist with the even distribution of the ground cremains, as well as to help remove bubbles in the still-wet adhesive, should they exist.

In step 120, the substantially even ground cremains are pressed into the second adhesive to aid in the adhesion of said cremains to the article. The second adhesive is allowed to dry in step 122. Similarly to step 112, the amount of time this will take depends on the ratio of the compounds of the adhesive, on temperature and humidity of the ambient environment and if a retarder is used.

The method 100 then advances to step 124 where any excess or loose particles are removed. Preferably, this is done by dropping the article once along each edge of the article, and optionally removing the excess particles with a fine brush. The excess cremains may be collected and placed in a bag. In step 126, the covered article is airbrushed or pressure pumped with a binder or fixative creating a prepared surface. In many preferred embodiments, this binder or fixative is Workable Fixatif, produced by Krylon® Products Group, a subsidiary of Sherwin-Williams® Company. In an exemplary embodiment, the fixative used is a mixture Dispersion K498, with 10% of the matting agent being Acematt HK 125-flakes, which is amorphous silica to avoid having a glossy finish. Note that the binder or fixative desirably is both substantially transparent and matte. In step 128 a grayscale image of the deceased human or animal is printed on the prepared surface to create a likeness of said deceased human or animal. In various embodiments, a color image of the deceased human or animal is printed on the prepared surface. This printing is done preferably by a flatbed ink printer, and can also be done as a double black print. Alternatively, this printing can be done through silkscreen transfer.

In other embodiments, the surface is covered with a light-sensitive emulsion, which can be developed as a photograph under an enlarger in a darkroom. Afterwards the developer and fixatif are painted onto the surface. The image can also be transferred onto the surface, buy using a solvent for the ink of a standard photocopy. If the likeness is achieved by painting or airbrushing the portrait onto the surface by an artist, the surface is preferably prepared with very small, rather dust-like particles of the cremated remains (the first two to four layers, so that it is smoother. The surface is then preferably further smoothened with a trowel or squeegee. In various embodiments, the method comprises the additional step of airbrushing the likeness with a varnish to keep everything in place. Preferably, the varnish is both matte and substantially transparent.

In a preferred embodiment, the likeness is housed within a shadowbox, preferably with a glare free museum glass in the front, which acts as a preserving mechanism as well as is an attractive way to house the likeness. The present disclosure also teaches the finished likeness of a deceased person or animal including their cremains in addition to the method of creating said likeness.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a method of preparing a likeness of a deceased human or animal. The disclosure is illustrated by example in the drawing figures, and throughout the written description. It should be understood that numerous variations are possible while adhering to the inventive concept. Such variations are contemplated as being a part of the present disclosure.

What is claimed is:

1. A method of preparing a likeness of a deceased human or animal, comprising the steps of:

providing an article having a top surface and a bottom surface, wherein the top surface is flat;

providing cremated remains of the deceased human or animal;

placing the article on a flat plane, wherein the bottom surface is adjacent to the flat plane and where the top surface is facing up;

placing a layer of a first adhesive mixed with a plurality of granular particles onto the top surface;

repeating the placing a layer step as needed until the top surface is substantially coated with the first adhesive mixed with a plurality of granular particles;

allowing the layers to dry;

placing a final layer of a second adhesive on the top surface;

preparing the cremated remains by grinding the remains;

sifting the ground remains onto the second adhesive to create a substantially even layer of ground remains;

pressing the substantially even layer of ground remains into the second adhesive;

allowing the second adhesive to dry;

removing any unattached ground remains from the dried second adhesive;

airbrushing the substantially even layer of ground remains with a binder or fixative creating a prepared surface; and printing a grayscale image of the deceased human or animal on the prepared surface to create the likeness of the deceased human or animal.

2. The method of claim 1, wherein the article is rigid.

3. The method of claim 2, wherein the article is a wooden board.

4. The method of claim 1, wherein the article is flexible.

5. The method of claim 4, wherein the article is canvas.

6. The method of claim 1, wherein the first adhesive is mixed with sand.

7. The method of claim 1, wherein the first adhesive is mixed with a portion of the cremated remains.

8. The method of claim 1, further comprising the step of mixing the first adhesive and the plurality of granular particles with at least one dye.

9. The method of claim 1, further comprising the step of initially treating the top surface with at least one layer of paint.

10. The method of claim 1, where the layers of the first adhesive mixed with the plurality of granular particles is placed via a high density foam roller.

11. The method of claim 1, wherein the second adhesive is a cellulose glue and binder mix.

12. The method of claim 1, wherein the fixative is a reworkable clear finish.

13. The method of claim 1, further comprising placing the likeness of the deceased human or animal in a shadowbox.

14. The method of claim 1, wherein the step of printing a grayscale image of the deceased human or animal on the prepared surface to create the likeness of the deceased human or animal is performed via a flatbed printer.

15. The method of claim 14, wherein the step of printing a grayscale image of the deceased human or animal on the prepared surface to create the likeness of the deceased human or animal is performed twice.

* * * * *